(12) United States Patent
Mahmoud et al.

(10) Patent No.: US 10,261,952 B1
(45) Date of Patent: Apr. 16, 2019

(54) RESTORING TEMPORAL COHERENCE OF PREVIOUSLY SEEN RANKED CONTENT

(71) Applicant: LinkedIn Corporation, Mountain View, CA (US)

(72) Inventors: Mohamed Gamal Mohamed Mahmoud, Santa Clara, CA (US); Hui Wang, Santa Clara, CA (US); Heidi W. Chao, Cupertino, CA (US); Tomer Cohen, Mountain View, CA (US); Hao-Hsien Ko, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 527 days.

(21) Appl. No.: 15/176,397

(22) Filed: Jun. 8, 2016

(51) Int. Cl.
*G06F 17/30* (2006.01)
*G06F 16/2457* (2019.01)
*G06F 16/248* (2019.01)
*G06F 16/2458* (2019.01)

(52) U.S. Cl.
CPC ...... *G06F 16/24578* (2019.01); *G06F 16/248* (2019.01); *G06F 16/2477* (2019.01); *G06F 17/3053* (2013.01); *G06F 17/30551* (2013.01); *G06F 17/30554* (2013.01)

(58) Field of Classification Search
None
See application file for complete search history.

(56) References Cited

U.S. PATENT DOCUMENTS

| | | | | |
|---|---|---|---|---|
| 8,583,675 B1* | 11/2013 | Haahr | .............. | G06F 17/30442 707/721 |
| 2009/0240586 A1* | 9/2009 | Ramer | ............. | G06F 17/30905 705/14.64 |
| 2014/0249960 A1* | 9/2014 | Mello | ................ | G06Q 30/0623 705/26.61 |
| 2015/0142557 A1* | 5/2015 | Krishnamurthy | .. | G06Q 30/0241 705/14.45 |
| 2015/0294377 A1* | 10/2015 | Chow | ................ | G06Q 30/0263 705/347 |
| 2016/0321222 A1* | 11/2016 | Greenberg | .......... | G06F 17/2247 |
| 2016/0328715 A1* | 11/2016 | Gideoni | .................. | H04L 67/22 |

* cited by examiner

*Primary Examiner* — Wilson Lee
(74) *Attorney, Agent, or Firm* — Park, Vaughan, Fleming & Dowler LLP (57) ABSTRACT

The disclosed embodiments provide a system for restoring temporal coherence of ranked content that was previously shown to a user. During operation, the system receives a set of content items to display to the user. For each content item, the system obtains a ranking score; determines if the content item was impressed upon the user during a prior session; and, if so, adds the content item to an impressed subset of content items. The system creates a display order for the set of content items by: removing the impressed content items from the set of content items; ordering the set of content items according to their ranking scores; ordering the impressed subset of content items according to their display order in the prior session; and inserting the impressed subset into the set of content items at a determined insertion point. The system then displays the ordered set of content items.

20 Claims, 7 Drawing Sheets

RESTORING TEMPORAL COHERENCE OF PREVIOUSLY SEEN RANKED CONTENT

BACKGROUND

Field

The disclosed embodiments relate to the ordering of content in a content system. More specifically, the disclosed embodiments relate to techniques for restoring temporal coherence of previously seen ranked content.

Related Art

Content feeds such as RSS (Really Simple Syndication) feeds and Atom feeds are mechanisms for presenting content to interested people (e.g., users or subscribers of an application or service) without requiring them to manually access or retrieve the content from one or more content sources. For example, a social network may generate a news feed of photos, audio, video, documents, articles, posts, status updates, likes, comments, shares, and/or other types of content or social network interaction for each user accessing the social network. The user may then click on a posting of the content item within the news feed to navigate to a website on which the content item is hosted and access the entirety of the content item.

While content feeds provide information to users in a central location that adds value and generally improves the user experience, the selection and ordering of content items in the content feed can dramatically alter the user experience. For example, if a user is presented with information at the start of the content feed that the user has already seen during a prior session, the user may think that the feed does not contain anything different from the prior session, even if there are new content items later in the feed. Furthermore, if a user returns to the feed to look for an item that was seen in a prior session, and sees a content item that was in close proximity to the desired item, but does not see the desired item, the user may think that the desired item is no longer available in the feed, even if it is in a different location within the feed. Note that this can result in user confusion and dissatisfaction.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system for ordering content in a content system. More specifically, the disclosed embodiments provide a method, apparatus, and system for restoring temporal coherence of ranked content that has already been seen.

Figure 1:
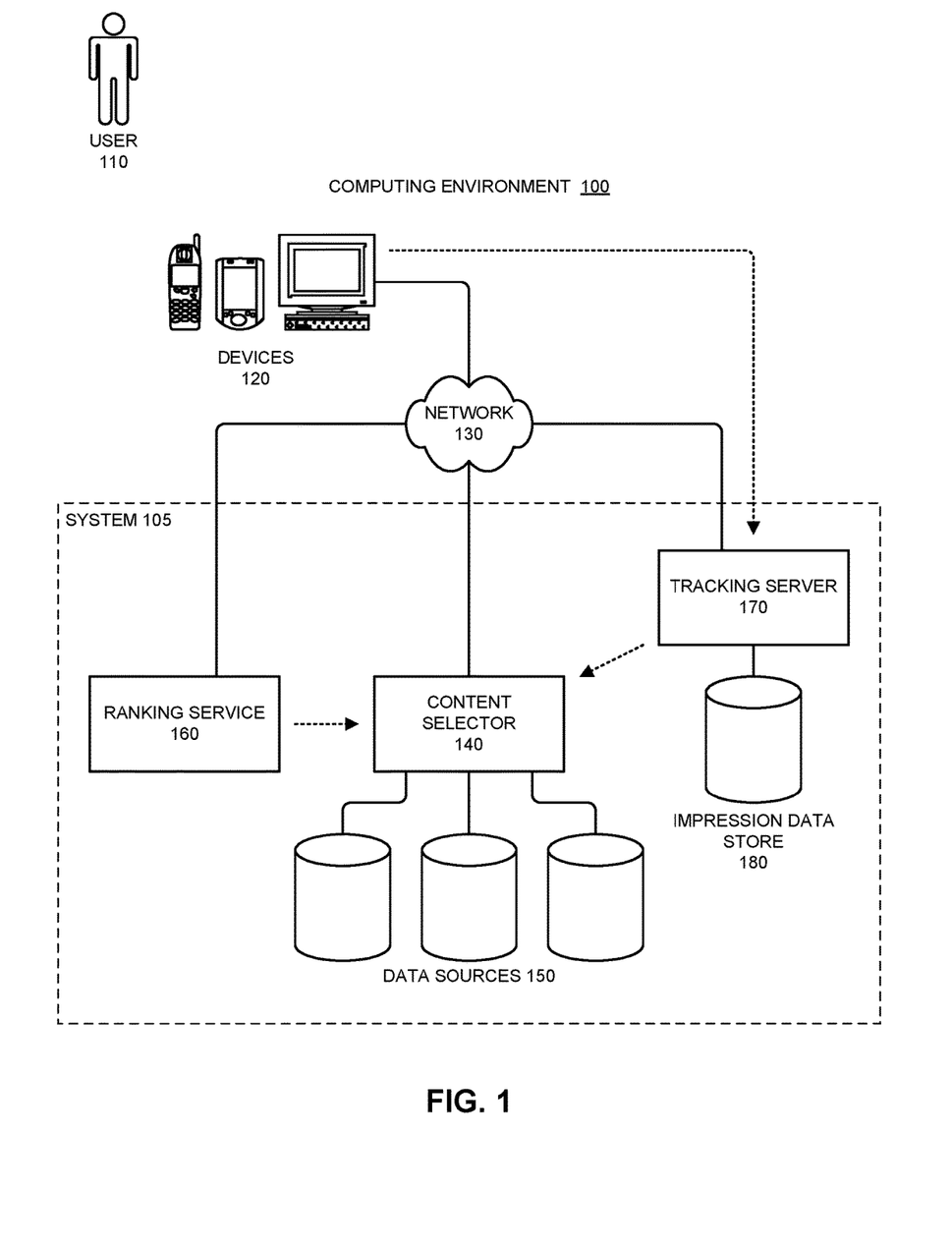
FIG. 1 shows a system for restoring temporal coherence of previously seen ranked content in accordance with the disclosed embodiments.

FIG. 1 shows a system for restoring temporal coherence to previously seen ranked content in accordance with the disclosed embodiments. FIG. 1 comprises computing environment 100. Note that this computing environment is shown for illustrative purposes only. While a specific embodiment is shown for computing environment 100, not all embodiments are intended to be limited to the illustrated computing environment.

Computing environment 100 comprises devices 120, network 130, and system 105, which includes content selector 140, data sources 150, ranking service 160, tracking server 170, and impression data store 180. User 110 interacts with devices 120, which can generally include any item capable of connecting to network 130 and displaying content to user 110. This may include, but is not limited to, smart phones, tablets, notebooks, computers, servers, appliances, smart watches, and e-readers.

Network 130 can generally include any type of wired or wireless communication channel capable of coupling computing nodes. This includes, but is not limited to, a local area network, a wide area network, a virtual private network, or a combination of networks. In one embodiment, network 130 includes the Internet.

System 105 comprises a collection of computing resources for supporting or hosting an application or service for delivering content to users such as user 110, such as a professional network or a social network. Content selector 140 identifies candidate content items for serving to user 110 and/or makes final selections regarding which items to serve. Ranking service 160 ranks some or all items selected for delivery to the user, which may affect which ones are served and/or the order in which they are presented. Tracking server 170 monitors the user's interaction with the served content. System 105 may include other components not depicted in FIG. 1

Within system 105, content selector 140 is coupled to data sources 150 and tracking server is coupled to impression data store 180. Data sources 150 and impression data store 180 can be or include any type of systems for storing data in non-volatile storage. Such systems include, but are not limited to, systems based upon magnetic, optical, or magneto-optical storage devices, as well as storage devices based on flash memory and/or battery-backed up memory.

During operation, users connect to and establish sessions with system 105 in order to receive and view content (e.g., articles, documents, posts, communications with other users). Each session may involve the serving of any number of content items from the system to a given user, in the form of one or more content feeds, for example.

Figure 2A:
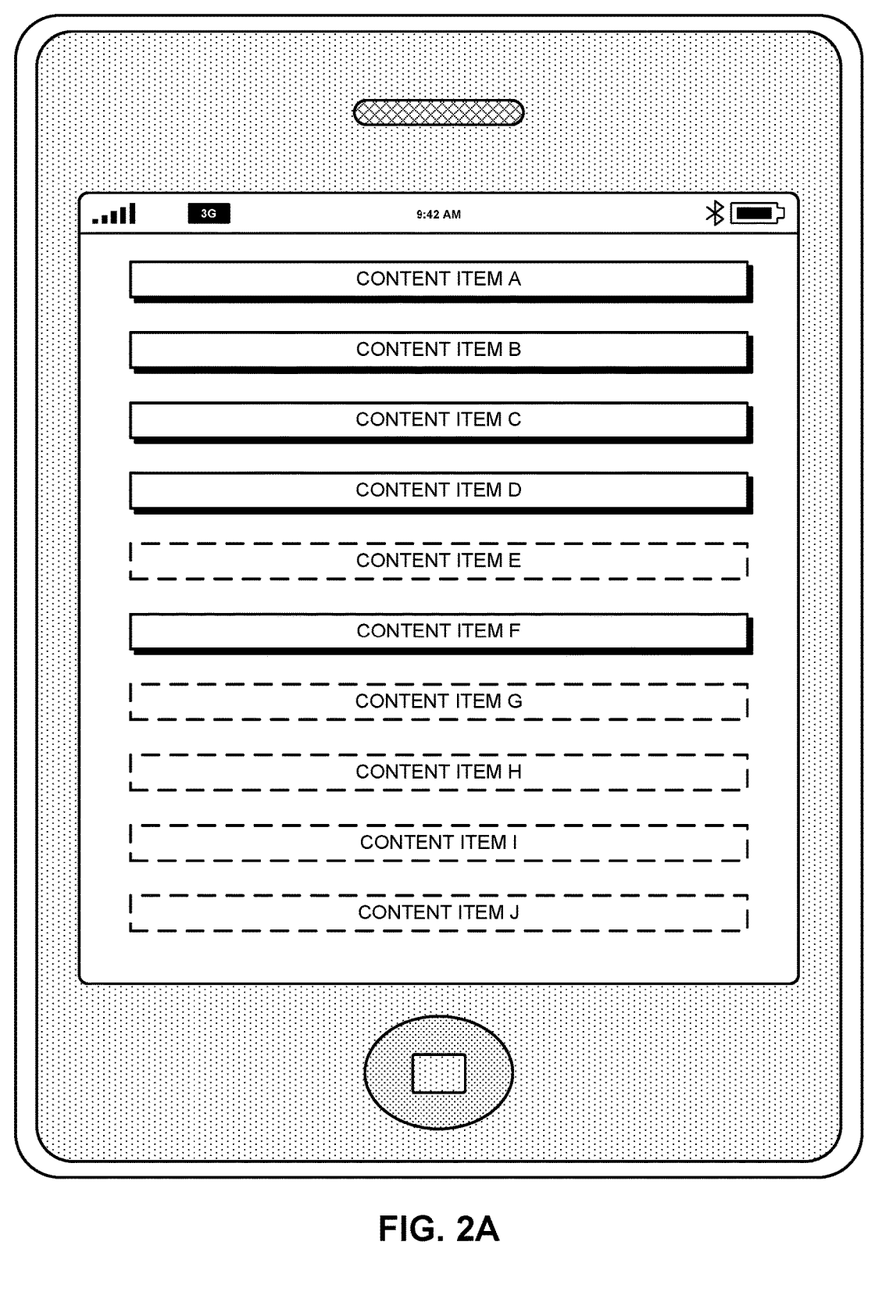
FIG. 2A shows a ranking of content during a first session in accordance with the disclosed embodiments.

FIG. 2A shows a ranking of content during a first session in accordance with the disclosed embodiments. FIG. 2A illustrates content items A-J being displayed on a device 120 operated by user 110. Note that while all of the content items A-J are illustrated, not all of content items A-J may be displayed simultaneously. The number of content items that may be displayed simultaneously is device dependent, and may be affected by numerous factors, including screen resolution, font sizes, device orientation, etc. FIG. 2A shows all content items A-J in order to indicate the display order of the content items during the first session with user 110.

During the first session, content items A, B, C, D, and F are impressed upon user 110. Note that a content item is impressed upon the user when the content item is displayed on the screen of the device for more than a threshold amount of time. For example, any content item displayed on the screen for more than 300 milliseconds could be considered as being impressed upon user 110. Also note that, in some embodiments, more than a threshold portion of a content item must be displayed in order for the item to be considered impressed. For example, if the threshold is 50%, a given content item would only be considered impressed upon user 110 if more than 50% of the content item was displayed on the screen of the device for more than the threshold amount of time. Note that in some embodiments, these threshold values may be set by a user, a system administrator, a content provider, or any combination thereof.

As illustrated, content items A, B, C, D, and F have solid borders to indicate that they have been impressed upon user 110. Content items E, G, H, I, and J have dashed borders to indicate that they have not been impressed upon user 110. Note that unimpressed content item E is ordered between impressed content items D and F. It is possible for an unimpressed item of content to exist between impressed items of content for various reasons. For example, user 110 may have scrolled quickly past content item E, in which case it was not displayed on the device of user 110 for more than the threshold amount of time, or user 110 scrolled past content item E before the page that contains content items A-J was fully loaded, in which case less than the threshold amount of the content item was displayed.

Figure 2B:
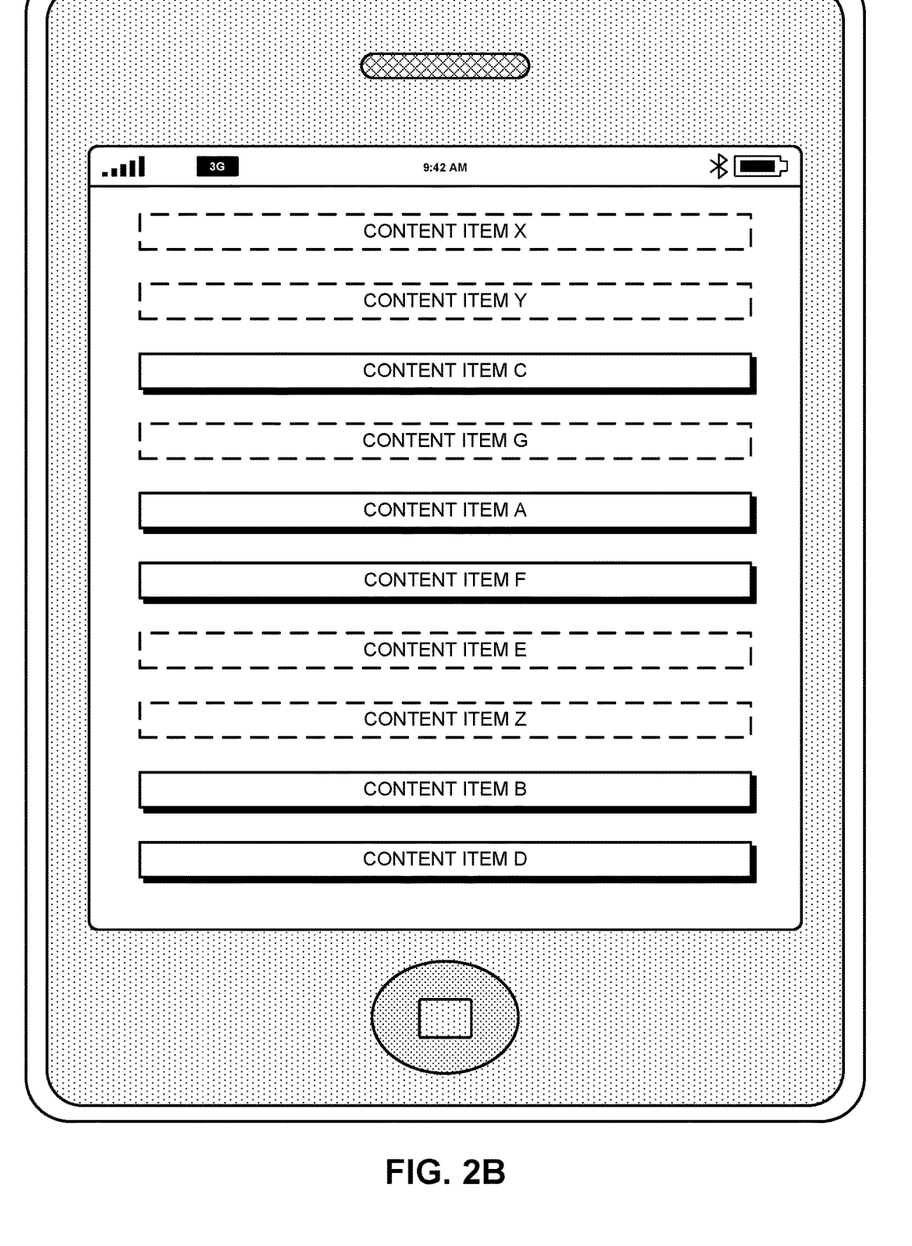
FIG. 2B shows a ranking of content during a second session without temporal coherence.

FIG. 2B shows a ranking of content during a second session without temporal coherence. As illustrated, impressed content items A, B, C, D, and F are again displayed on the device, as well as unimpressed content items E and G from the first session. In addition, new unimpressed content items X, Y, and Z are also displayed on the device. Items of content with the same letters from FIG. 2A, FIG. 2B, and FIG. 2C represent the same items of content.

Note that content items A-G from the first session are displayed in an entirely different order in the second session than they were displayed in the first session. This may be confusing to user 110, and may result in reduced user satisfaction. User 110 might see content item C, and recognize it from the first session. At this point, user 110 may erroneously believe that all of the content items after content item C have already been seen by user 110. User 110 may also have trouble locating previously impressed items of content from the first session because they are not proximate to items of content in the second session that user 110 remembers them being proximate to in the first session.

Figure 2C:
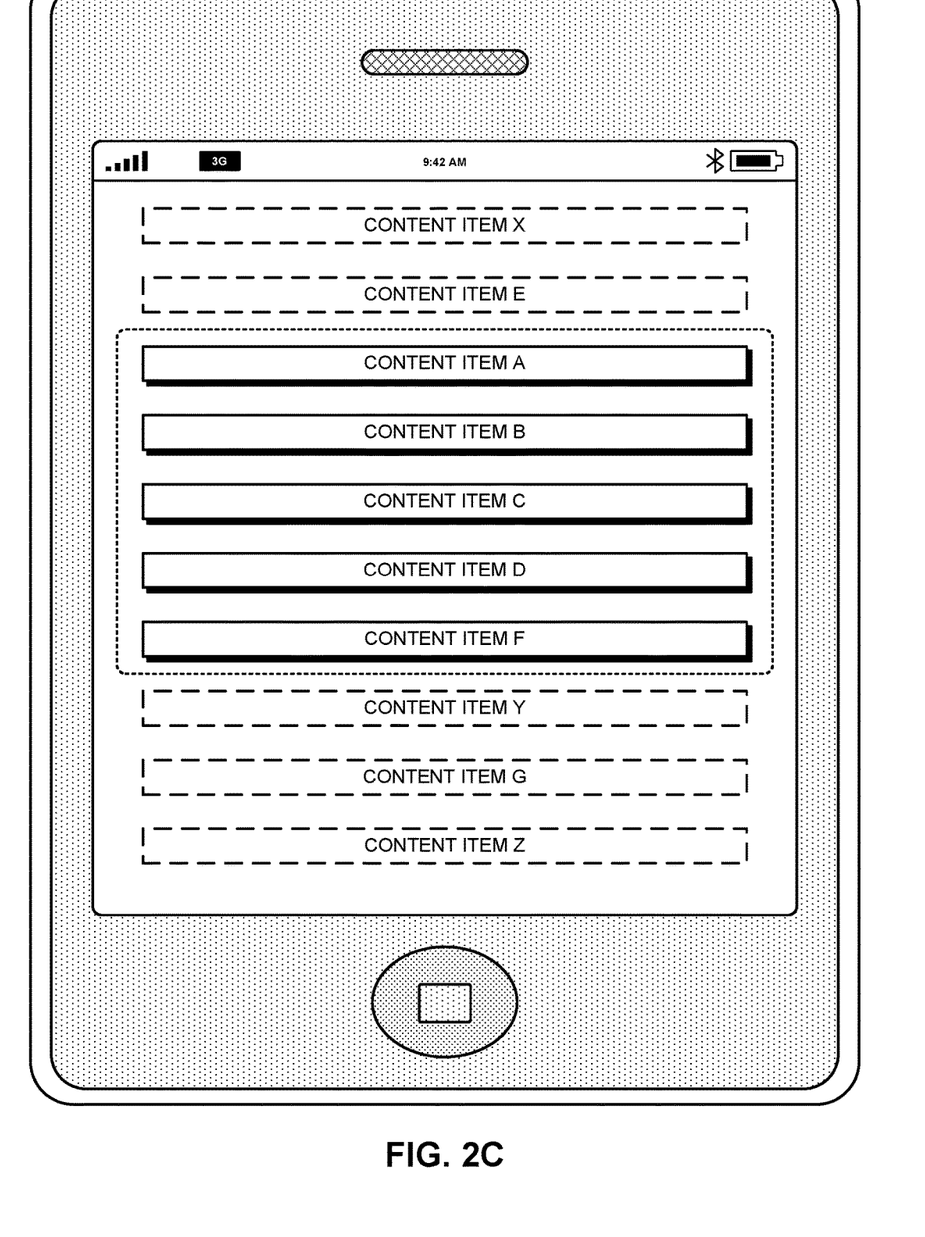
FIG. 2C shows a ranking of content during a second session with temporal coherence in accordance with the disclosed embodiments.

FIG. 2C shows a ranking of content during a second session with temporal coherence in accordance with the disclosed embodiments. Like FIG. 2B, impressed content items A, B, C, D, and F are displayed on the device, as well as unimpressed content items E and G from the first session. In addition, new unimpressed content items X, Y, and Z are also displayed on the device. Note that impressed content items A, B, C, D, and F are displayed in the same temporal order as they were displayed in the first session. Also note that impressed content items A, B, C, D, and F are displayed in a contiguous block. Unimpressed content items E and G from the first session are re-ranked with new unimpressed content items X, Y, and Z.

In some embodiments, the system may receive new rankings for items of content that were already impressed to user 110 in the first session. In these embodiments, the system may ignore the new rankings to preserve the temporal order of the impressed items of content from the first session, but may use the new ranking to help determine where the contiguous block of impressed content from the first session should be placed in the feed of the second session.

Restoring Temporal Coherence of Previously Seen Ranked Content

Figure 3:
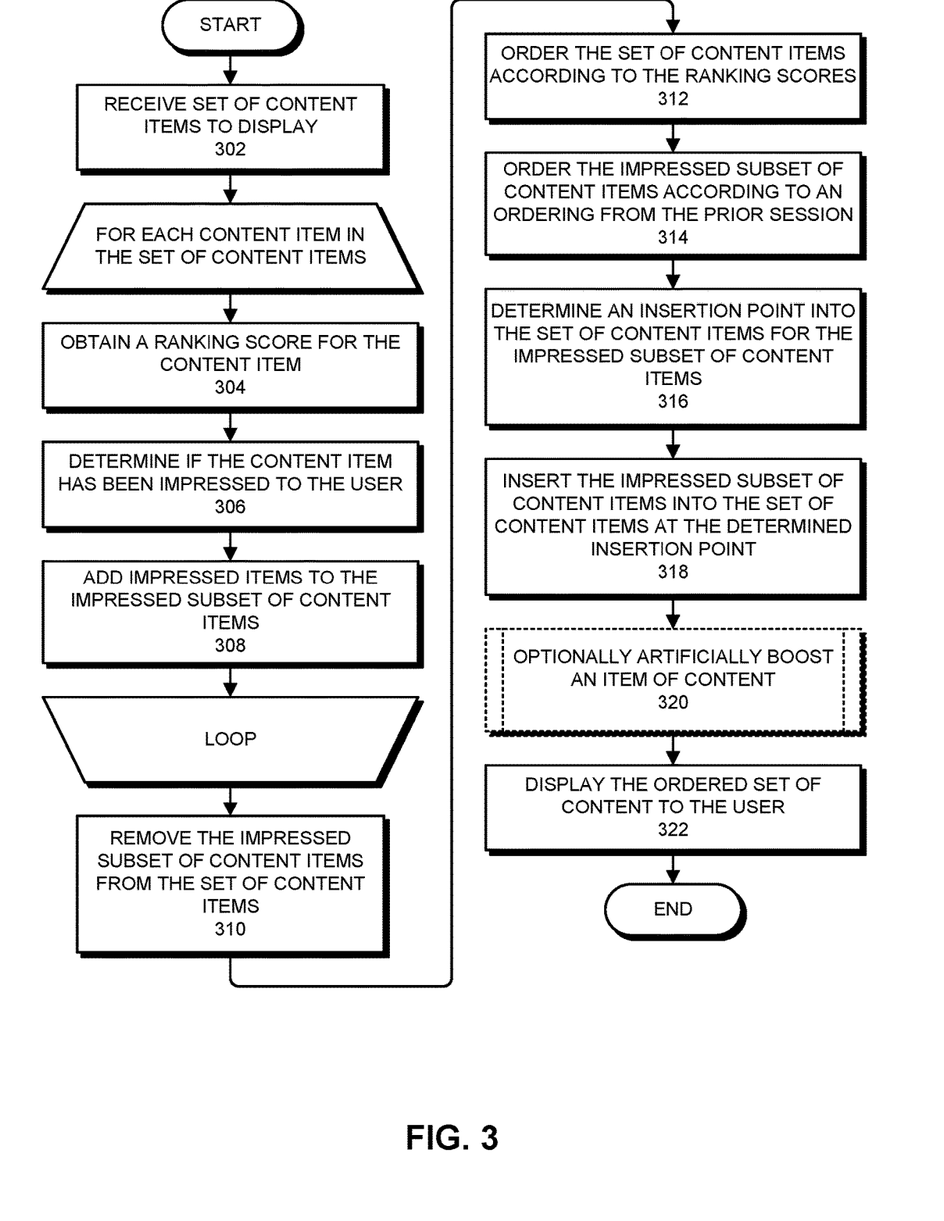
FIG. 3 shows a flowchart illustrating the processing of restoring temporal coherence of already-seen ranked content in accordance with the disclosed embodiments.

FIG. 3 shows a flowchart illustrating the processing of restoring temporal coherence of already-seen ranked content in accordance with the disclosed embodiments.

During operation, the system receives a set of content items to display to user 110 during a current user session (operation 302). Note that in some embodiments, this involves content selector 140 of system 105 of FIG. 1 receiving content from data sources 150. Also note that this content may include images, videos, news articles, books, blog posts, updates regarding the user's connections within a user community, etc. For each content item in the set of content items, the system obtains a ranking score for the content item (operation 304), determines if the content item was previously impressed to user 110 (operation 306), and adds the content item to an impressed subset of content items if the content item was impressed (operation 308).

Obtaining the ranking score for the content items may involve obtaining the ranking score from an external service or source. For example, the ranking score for the content items may be obtained from ranking service 160. Note that, for embodiments described herein, it does not matter how the ranking scores are determined for the items of content, or who or what provides the ranking scores.

Determining if the content item was impressed to user 110 may involve utilizing tracking server 170. In some embodiments, tracking server 170 receives information from the client device operated by user 110, flags the items of content that have been impressed upon user 110, and saves the impressed status of the content items to impression data store 180. As described previously, various criteria may be used when determining whether or not an item of content has been impressed upon user 110. Tracking server 170 may also store the temporal order for impressed items of content.

Next, the system creates a display order for the set of content items by: removing the impressed subset of content items from the set of content items (operation 310), ordering the remaining content items according to their ranking scores (operation 312), ordering the impressed subset of content items according to the order in which they were displayed in the prior session (operation 314), determining where in the set of content items to insert the impressed subset of content items (operation 316), and inserting the impressed subset of content items into the set of content items at the selected insertion point (operation 318).

Note that the insertion point for the impressed subset of content items may be determined many different ways. For example, in some embodiments, the system calculates a collective ranking score for the impressed subset of content items, treating the entire impressed subset of content items as a single item of content. This collective ranking score may be based upon an average and/or a median of the ranking scores for the content items in the impressed subset of content items.

There may additionally be a minimum number of unimpressed content items to display prior to the impressed subset of content items. For example, the system may determine that the first two items should always be unimpressed items of content, thus prioritizing the top two unimpressed items of content over any already impressed items of content.

In some embodiments, determining the insertion point for the impressed subset of content items is user dependent, device dependent, or both. This may be based upon perceived habits and observed browsing patterns of user 110. For example, the system may determine that the minimum number of unimpressed items of content may be greater for user 110's tablet than it is for user 110's smart phone. The factors in determining the insertion point can include environmental variables, user settings, system administrator settings, content provider settings, observed actions, etc.

In some embodiments, determining the minimum number of unseen content items to precede the impressed subset of content items is based on an n-th percentile of a number of items in the impressed subset of content items, while in other embodiments, the minimum number is based on an amount of elapsed time since the prior session. For example, the greater the amount of time that has elapsed, the larger the minimum number of unseen content items may be.

In some embodiments, if a predetermined amount of time has elapsed since the prior session, the system may disregard all impression data and treat all items of content as if they have not been impressed upon user 110. For example, if user 110 has not been active with the system for more than 48 hours, the system may purge all impression data for user 110. Similarly, in some embodiments, impression data expires after a pre-determined amount of time has elapsed.

Optionally, the system artificially boosts an item of content (operation 320). Note that this may occur if an item of content becomes very popular or trends upward after it was already impressed to user 110. Artificially boosting an item of content is described in more detail below with respect to FIG. 4.

Finally, the system displays the set of content items in the display order on the computing device to user 110 (operation 322). Note that in some embodiments, the system also handles sponsored items of content. These sponsored items of content may be placed in predetermined positions within the display user 110's device or at predetermined positions within the ordering of content items.

Figure 4:
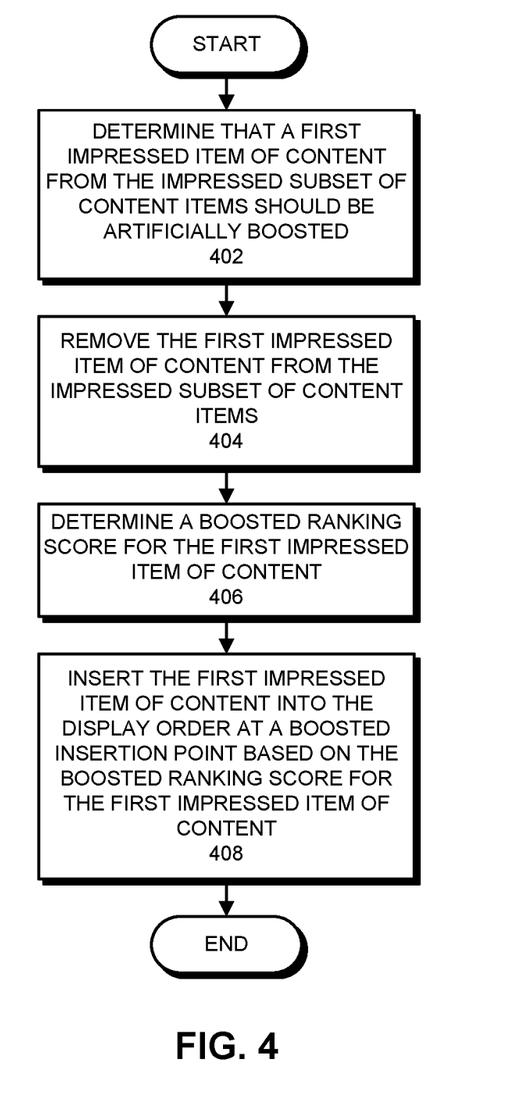
FIG. 4 shows a flowchart illustrating the process of artificially boosting content in accordance with the disclosed embodiments.

FIG. 4 shows a flowchart illustrating the process of artificially boosting content in accordance with the disclosed embodiments.

During operation, the system determines that a first impressed item of content from the impressed subset of content items should be artificially boosted (operation 402). As described previously, this boosting of content can be due to numerous factors, including trending patterns of the item of content, recommendations for the item of content from other users, sponsorship of an item of content, etc.

Next, the system removes the first impressed content item from the impressed subset of content items (operation 404). The system then determines a boosted ranking score for the content item (operation 406). Finally, the system inserts the first impressed item of content into the display order at a boosted insertion point based on its boosted ranking score (operation 406).

It is important to note that in some embodiments, items of content that were previously impressed may disappear from a content feed during subsequent sessions. For example, a previously displayed content item may no longer be available because it was recalled by its source or it has expired. In these embodiments, the content item is simply removed without affecting the ordering of any other content items.

Figure 5:
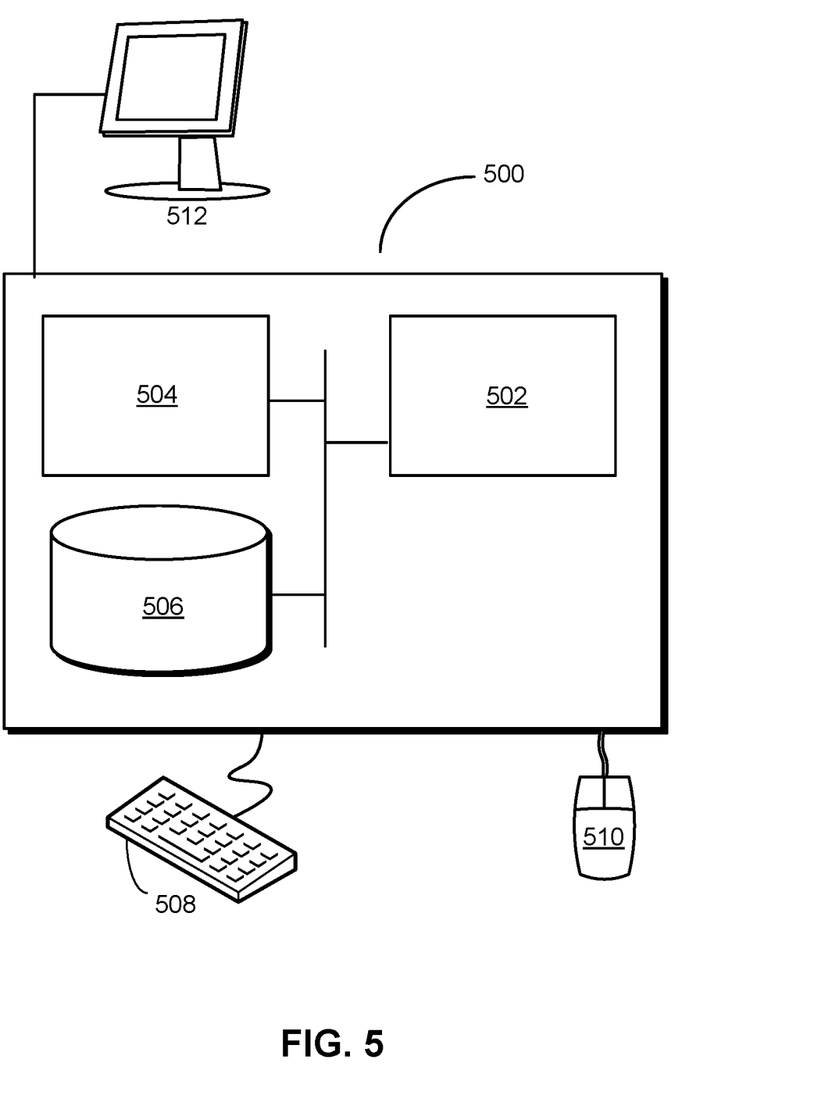
FIG. 5 shows a computer system in accordance with the disclosed embodiments.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for ordering content (e.g., in a feed). In these embodiments, content items that were impressed upon a user in an earlier content-delivery session are grouped together in the order they were previously displayed, which maintains their temporal coherence. During a subsequent session, new (not previously displayed) items may be ordered before and/or after the impressed content.

Note that one or more components of computer system 500 may be remotely located and connected to the other components over a network. Portions of the present embodiments may also be located on different nodes of a distributed system that implements the embodiments. For example, the present embodiments may be implemented using a cloud computing system that tracks user impressions of content items and maintains temporal coherence of already-seen ranked content.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. A method, comprising:
   receiving a set of content items to display to a user during a current user session;
   for each content item in the set of content items:
      obtaining a ranking score for the content item;
      determining if the content item has been impressed to the user, wherein a content item has been impressed if it was displayed to the user for a predetermined amount of time during a prior session; and
      when the content item was impressed to the user, adding the content item to an impressed subset of content items;
   creating a display order for the set of content items by:
      removing the impressed subset of content items from the set of content items;
      ordering the set of content items according to the ranking scores for the content items;
      ordering the impressed subset of content items according to an ordering from the prior session; and
      inserting the impressed subset of content items into the set of content items at a determined insertion point; and
   displaying the set of content items in the display order on the computing device.

2. The method of claim 1, wherein creating the display order for the set of content items further involves:
   determining that a first content item is a sponsored item of content; and
   placing the first content item in a predetermined position in the display order regardless of the ranking score of the first content item.

3. The method of claim 1, wherein determining the insertion point involves determining a collective ranking score for the impressed subset of content items.

4. The method of claim 3, wherein the collective ranking score for the impressed subset of content items is based on an average of the ranking scores for the content items in the impressed subset of content items.

5. The method of claim 3, wherein the collective ranking score for the impressed subset of content items is based on a median of the ranking scores for the content items in the impressed subset of content items.

6. The method of claim 1, wherein determining the insertion point involves determining a minimum number of unseen content items to precede the impressed subset of content items in the display order.

7. The method of claim 6, wherein the minimum number of unseen content items to precede the impressed subset of content items is based on an n-th percentile of a number of items in the impressed subset of content items.

8. The method of claim 6, wherein the minimum number of unseen content items to precede the impressed subset of content items is based on an amount of elapsed time since the prior session.

9. The method of claim 6, wherein the minimum number of unseen content items to precede the impressed subset of content items is based on a device operated by the user.

10. The method of claim 6, wherein the minimum number of unseen content items to precede the impressed subset of content items is based on the user.

11. The method of claim 1, wherein creating the display order for the set of content items further involves:
    determining that a first impressed item of content from the impressed subset of content items should be artificially boosted;
    removing the first impressed item of content from the impressed subset of content items;
    determining a boosted ranking score for the first impressed item of content; and
    inserting the first impressed item of content into the display order at a boosted insertion point based on the boosted ranking score for the first impressed item of content.

12. The method of claim 1, wherein determining if the content item has been impressed to the user involves determining if at least a threshold amount of the content item was displayed to the user for the predetermined amount of time.

13. An apparatus, comprising:
    one or more processors; and
    memory storing instructions that, when executed by the one or more processors, cause the apparatus to:
    receive a set of content items to display to a user during a current user session;
    for each content item in the set of content items:
       obtain a ranking score for the content item;
       determine if the content item has been impressed to the user, wherein a content item has been impressed if it was displayed to the user for a predetermined amount of time during a prior session; and
       when the content item was impressed to the user, add the content item to an impressed subset of content items;
    create a display order for the set of content items by:
       removing the impressed subset of content items from the set of content items;
       ordering the set of content items according to the ranking scores for the content items;
       ordering the impressed subset of content items according to an ordering from the prior session; and
       inserting the impressed subset of content items into the set of content items at a determined insertion point; and
    display the set of content items in the display order on the computing device.

14. The apparatus of claim 13, wherein determining the insertion point involves determining a collective ranking score for the impressed subset of content items.

15. The apparatus of claim 14, wherein the collective ranking score for the impressed subset of content items is based on at least one of:
    an average of the ranking scores for the content items in the impressed subset of content items; and
    a median of the ranking scores for the content items in the impressed subset of content items.

16. The apparatus of claim 13, wherein determining the insertion point involves determining a minimum number of unseen content items to precede the impressed subset of content items in the display order.

17. The apparatus of claim 16, wherein the minimum number of unseen content items to precede the impressed subset of content items is based on at least one of:

an n-th percentile of a number of items in the impressed subset of content items;
an amount of elapsed time since the prior session;
a device operated by the user; and
the user.

18. The apparatus of claim 13, wherein creating the display order for the set of content items further involves:
   determining that a first impressed item of content from the impressed subset of content items should be artificially boosted;
   removing the first impressed item of content from the impressed subset of content items;
   determining a boosted ranking score for the first impressed item of content; and
   inserting the first impressed item of content into the display order at a boosted insertion point based on the boosted ranking score for the first impressed item of content.

19. A system, comprising:
   a receiving mechanism comprising a non-transitory computer-readable medium comprising instructions that, when executed, cause the system to:
      receive a set of content items to display to a user during a current user session; and
      obtain a ranking score for each content item in the set of content items;
   a determination mechanism comprising a non-transitory computer-readable medium comprising instructions that, when executed, cause the system to:
      for each content item in the set of content items:
         determine if the content item has been impressed to the user, wherein a content item has been impressed if it was displayed to the user for a predetermined amount of time during a prior session; and
         when the content item was impressed to the user, add the content item to an impressed subset of content items;
   an ordering mechanism comprising a non-transitory computer-readable medium comprising instructions that, when executed, cause the system to create a display order for the set of content items by:
      removing the impressed subset of content items from the set of content items;
      ordering the set of content items according to the ranking scores for the content items;
      ordering the impressed subset of content items according to an ordering from the prior session; and
      inserting the impressed subset of content items into the set of content items at a determined insertion point; and
   a display mechanism comprising a non-transitory computer-readable medium comprising instructions that, when executed, cause the system to display the set of content items in the display order on the computing device.

20. The system of claim 19, wherein the ordering mechanism determines the insertion point by determining a collective ranking score for the impressed subset of content items.

* * * * *